(12) United States Patent
Swann et al.

(10) Patent No.: US 8,422,431 B2
(45) Date of Patent: *Apr. 16, 2013

(54) APPARATUS, AND ASSOCIATED METHOD, FOR IDENTIFYING RADIO NETWORK SERVICE AVAILABILITY

(75) Inventors: Craig Swann, Waterloo (CA); Joseph T. Deu-Ngoc, Maryhill (CA); Gjalt Gerritt de Jong, Leuven (BE)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,841

(22) Filed: Aug. 17, 2011

(65) Prior Publication Data
US 2011/0299473 A1   Dec. 8, 2011

Related U.S. Application Data

(63) Continuation of application No. 10/917,827, filed on Aug. 13, 2004, now Pat. No. 8,023,451.

(51) Int. Cl.
*H04W 4/00* (2009.01)
(52) U.S. Cl.
USPC ..... 370/328; 455/434; 455/435.1; 455/435.2; 455/435.3; 455/515

(58) Field of Classification Search ............ 370/328; 455/434, 435, 1, 435.2, 435.3, 515
See application file for complete search history.

(56) References Cited

U.S. PATENT DOCUMENTS

| | | | |
|---|---|---|---|
| 4,905,301 A | 2/1990 | Kropp et al. | |
| 7,657,234 B2 * | 2/2010 | Qu et al. | 455/72 |
| 8,023,451 B2 * | 9/2011 | Swann et al. | 370/328 |
| 2002/0176391 A1 | 11/2002 | Hermann et al. | |
| 2004/0110522 A1 * | 6/2004 | Howard et al. | 455/512 |
| 2005/0070277 A1 * | 3/2005 | Hu | 455/432.3 |

\* cited by examiner

*Primary Examiner* — Kamran Afshar
*Assistant Examiner* — Sayed T Zewari

(57) ABSTRACT

Apparatus, and an associated method, for identifying availability of services in a radio network of a radio communication system. A system information message is generated at the radio access network that identifies the service availability of the radio network, such as by indicating the communication services supported by the network. The system information message, once generated, is communicated upon a broadcast control channel, or other appropriate channel, and delivered to a mobile node. The mobile node detects the system information message and determines the availability of services of the radio network therefrom. Selection of whether to register with the network is made responsive to whether the network supports the communication service that the mobile node intends to initiate.

12 Claims, 3 Drawing Sheets

APPARATUS, AND ASSOCIATED METHOD, FOR IDENTIFYING RADIO NETWORK SERVICE AVAILABILITY

CROSS-REFERENCE OF RELATED APPLICATION

The present application is a continuation of U.S. patent application Ser. No. 10/917,827 filed on Aug. 13, 2004, the contents of which are incorporated herein by reference.

The present invention relates generally to a manner by which to identify available services in a radio network. More particularly, the present invention relates to apparatus, and an associated method, by which to generate a system information message that identifies the service availability of the radio network. The present invention more particularly further relates to apparatus, and an associated method, by which to detect, at a mobile node, the system information message and the service availability identification.

The system information message is broadcast on a broadcast control channel (BCCH), a packet broadcast control channel (PBCCH), or an other appropriate channel. A mobile node, upon detection of the system information message, is able to determine what communication services are supported by the network and to decide whether to attempt to communicate therethrough. A decision is able to be made at the mobile node prior to registration with the network whether effectuation of a communication service by way of the network is possible. When more than one network is available, system information messages generated by the separate networks are detected and analyzed, and a determination of by way of which network, if any, best to effectuate the communication service is selected.

BACKGROUND OF THE INVENTION

Modern communication systems have benefited from advancements in communication technologies. When implemented in existing communication systems, such advancements provide for improved communications, e.g., more efficient communication of data, communication of data at higher communication rates, or in manners that better provide for the successful communication of the data in adverse communication conditions. And, advancements in communication technologies have permitted the development of new types of communication systems, providing for the effectuation of new types of communication services, and providing for better user experiences. As advancements in communication technologies shall likely continue, their implementation into existing and yet other new communication systems shall likely also continue in the future.

Communication systems are regularly utilized by many, and, for many users, ready access to communicate by way of any of various communication systems is necessary. Data is communicated upon a communication system by a user both to send data to another location and to receive data that is sent from a remote location.

Advancements in digital communication technologies are amongst the technological advancements that have been implemented in communication systems. Use of digital communication techniques provides various communication advantages. For instance, improved communication efficiencies are provided as redundancies in data that is to be communicated are removed prior to communication of the data. By improving the communication efficiency, the throughput rate of the data in the communication system is increased, relative to the throughput rate permitted of a corresponding analog communication system.

A radio communication system is an exemplary type of communication system. In a radio communication system, communication stations operable therein send and receive data communicated upon radio communication channels. The radio communication channels are defined upon portions of the electromagnetic spectrum. Free of the need to interconnect communication stations by way of wireline connections, radio communication systems permit for the effectuation of communications between locations at which interconnection of communication stations by way of wireline connections would not be possible or practical. Additionally, a radio communication system is implementable as a mobile communication system providing communication mobility to the communications.

A cellular communication system is an exemplary type of radio communication system. A cellular communication system includes a network part, referred to as network infrastructure, that is installed over a geographical area that is encompassed by the communication system.

Cellular communication systems generally conform to operational parameters set forth in an operating specification. Operating specifications are promulgated by standard-setting, regulatory bodies. And, the regulatory bodies have promulgated successive generations of operating standards, each generation taking advantage of advancements in communication technologies.

The network infrastructures of more than one generation of cellular communication systems might well be installed to encompass common geographical areas. And, the network infrastructures of cellular communication systems of the same generation, operated, e.g., by different network operators, might also be installed over a common geographical area.

Different cellular communication systems are of different communication capabilities and, accordingly, service availabilities. That is to say, different ones of the communication systems support different communication services. For instance, while so-called first generation cellular communication systems generally provide primarily voice communication services and only limited data communication services, subsequent generations of cellular communication systems provide for increasingly-intensive data communication services. An exemplary second-generation communication system, a GSM (Global System for Mobile communications) communication system provides for some data communication services. An extension to the GSM system, referred to as GPRS (General Packet Radio Service) permits for the effectuation of significantly more data-intensive communication services.

Even though the coverage areas of more than one cellular, or other, communication system might encompass a common geographical area, the different systems might exhibit different communication characteristics and capabilities. A communication service might be effectable in one of the communication systems and not another. That is to say, different communication systems support different services and exhibit different services availabilities. A service supported in one communication system might not be supported in another communication system. And, when a mobile node is positioned within the coverage area of the radio network of a radio communication system, a communication service can only be effectuated by way of the network if the network supports the communication service. And, when the mobile node is positioned at a location encompassed by a plurality of radio networks, selection of by way of which network to communicate pursuant to effectuation of a selected communication service must be appropriately made in order for the communication service to be effectuated.

A mobile node generally accesses a service offered by a radio network to communicate therethrough by way of a registration procedure. During a registration procedure, signaling between the radio network and the mobile node is carried out, and, if the registration is successful, the mobile node gains access to the service carried over the radio network to communicate therethrough. Conventionally, the mobile node is unable to determine the availability of services in the network until the registration is completed and the mobile node accesses the network. If, subsequent to registration, the mobile node determines that the desired communication service is not supported by the network which the mobile node is accessing, the mobile node is withheld of the communication service or the mobile node attempts registration with another radio network, and the process is repeated.

In essence a trial and error process is carried out that requires signaling between the mobile node and each network with which the mobile node registers, potentially introducing significant delay periods prior to effectuation of the communication service.

If a manner could be provided by which better to identify the service availability of a radio network, a communication service could be carried out more efficiently.

It is in light of this background information related to communications in a radio communication system that the significant improvements of the present invention have evolved.

SUMMARY OF THE INVENTION

The present invention, accordingly, advantageously provides apparatus, and an associated method, by which to identify communication service availabilities of a radio network.

Through operation of an embodiment of the present invention, a manner is provided by which to generate a system information message that identifies the availability of services of the radio network.

Also through operation of an embodiment of the present invention, a manner is provided by which to detect, at a mobile node, the system information message and a manner is provided to identify the available services.

In one aspect of the present invention, the system information is broadcast on a broadcast control channel (BCCH), a packet broadcast control channel (PBCCH), or an other appropriate channel. The mobile node monitors the channel and detects the system information message broadcast thereon. Upon detection and analysis of the system information message, the mobile node is able to determine the communication services that are supported by the network from which the system information message is broadcast. A decision is made at the mobile node of whether to communicate by way of the radio network responsive to whether the radio network supports the communication service that is desired to be effectuated by the mobile node.

The information required for the mobile node to make its decision is provided prior to registration of the mobile node to the network. The information of the service availabilities in the radio network are provided to the mobile node merely by scanning the control channel upon which the system information message is broadcast. Registration, and the signaling associated with registration, is not required to be performed to provide the information of the service availability of the radio network. Time delays associated with registration of the mobile node to a radio network that does not support the communication service that is to be effectuated by the mobile node are avoided. When a determination is made that a radio network does not support the communication service that is to be effectuated, registration is not attempted.

By scanning the control channels upon which system information messages are broadcast by different radio networks that encompass a common geographical area, the mobile node is able to determine which of the available radio networks support communication services that are to be effectuated by the mobile node. Radio networks that do not support the communication service are removed from further consideration from use to effectuate the communication service. And, if more than one radio network is both available and supports the communication service that is to be effectuated, selection of with which of the networks to register is based upon additional consideration or arbitrary selection.

In another aspect of the present invention, a scan list is maintained at the mobile node that identifies the channels upon which system information messages are broadcast by different radio networks. The mobile node selectably scans the channels identified on the scan list. Detection of messages broadcast on the different ones of the channels identify that the mobile node is in the coverage areas of such networks. And, through analysis of the system information messages broadcast on the different ones of the channels, the mobile node further identifies the availability of services of the radio networks. Selection of which, if any, available network through which to communicate to effectuate the desired communication service is then made, and the mobile node registers with the selected network. Effectuation of the communication service then commences.

In another aspect of the present invention, the mobile node forms a packet-service capable node, capable of effectuating an end-to-end packet communication service. When a packet communication service is to be effectuated by the mobile node, the mobile node must communicate by way of a radio network that supports the packet communication service. The mobile node determines whether a radio network that supports the packet communication service is available by monitoring the broadcast, or other, control channel upon which system information messages are broadcast to determine the availability of such a radio network. If a network is available, the mobile node registers with the network, and the effectuation of the communication service commences.

When the radio network operates in general conformity with the operating protocols as defined in the operating specification of the global system for mobile communications that supports GPRS (general packet radio service), the system information message generated by the radio network forms, e.g., a SYS INFO 13-GPRS INFO message. The message includes a field forming a bitmap that identifies services supported by the radio network. By detecting the message, the mobile node is able to determine, immediately upon the end of its scan of the channel, upon which the message is broadcast, what services are available by way of the network.

The network includes, embodied, e.g., at a base station controller, a message generator for generating the system information message that identifies the available end-to-end, or other, services in the network. The network also includes a signal transmitter that transmits, e.g., upon a broadcast control channel, the system information message.

The mobile node includes a detector for detecting the system information message, and a message analyzer for analyzing the detected message. Through appropriate analysis of the message, the mobile node is able to determine whether the radio network supports the communication service that is to be effectuated by the mobile node.

In these and other aspects, therefore, apparatus, and an associated method, is provided for facilitating identification of service availability of a radio network in whose coverage area that the mobile node is positionable. A detector is embodied at the mobile node. The detector detects communication on a broadcast control channel of a system information message that includes values representative of the available services in the radio network. A service availability identifier is adapted to receive indications of the values of the system information message detected by the detector. The service availability identifier identifies the available services of the radio network responsive to the indications of the values of the system information message.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
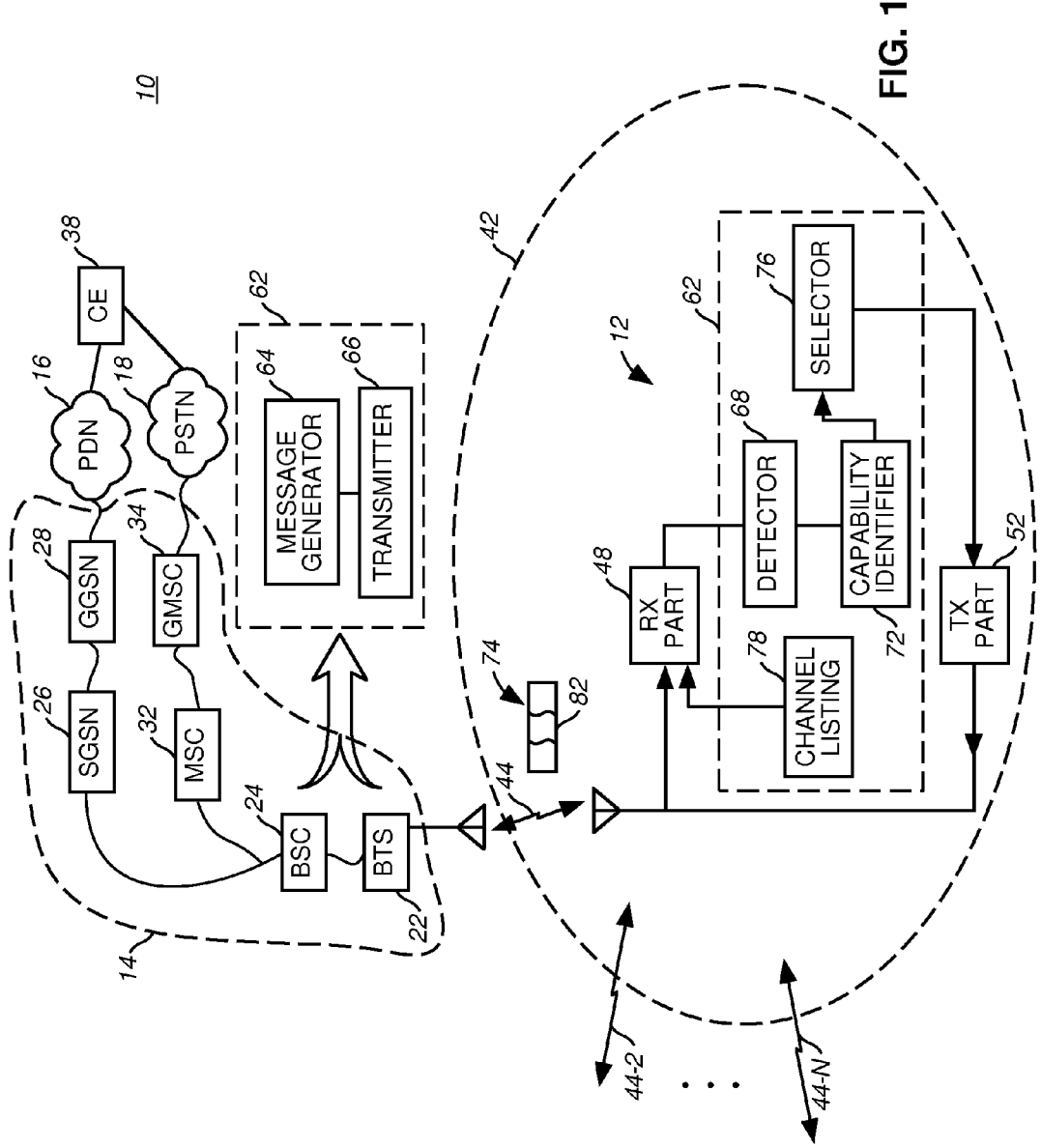
FIG. 1 illustrates a functional block diagram of a radio communication system in which an embodiment of the present invention is operable.

Referring first to FIG. 1, a radio communication system, shown generally at 10, provides for radio communications with mobile nodes, of which the mobile node 12 is representative. The communication system includes network infrastructure, including radio networks of which a radio access network 14 is exemplary. The radio access network 14 is coupled to a packet data network (PDN) 16. In the exemplary representation shown in the figure, the radio access network 14 forms a GSM/GPRS (Global System for Mobile communications/General Packet Radio Service) radio network. Other radio access networks, for instance UMTS (Universal Mobile Telephone Service) networks, are analogously operable to provide for radio communications with mobile nodes, and are analogously representable.

Here, the GSM/GPRS radio access network includes a base transceiver station (BTS) 22, a base station controller (BSC) 24, an SGSN (Serving GPRS Service Node) 26, and a GGSN (Gateway GPRS Service Node) 28. The GGSN is coupled to the packet data network. The base transceiver station, base station controller, SGSN, and GGSN form the GPRS architecture of the radio access network.

The radio access network further includes a mobile switching center (MSC) 32 and a gateway mobile switching center (GMSC) 34. The GMSC is coupled to the public switched telephonic network (PSTN) 18. The base transceiver station, the base station controller, the mobile switching center, and the gateway mobile switching center form the GSM architecture of the radio access network.

A correspondent entity (CE) 38 is coupled to the packet data network, the public switched telephonic network, or both networks. The correspondent entity is representative of a communication node that forms an endpoint of an end-to-end communication service. The radio access network 14 encompasses a coverage area, here represented by the coverage area 42. For purposes of explanation, the coverage area 42 corresponds to the coverage area, i.e., the cell, defined by the base transceiver station 22. An actual network typically includes a plurality of base transceiver stations, and the coverage area of the network is formed of the aggregation of the coverage areas of the individual base transceiver stations.

Data is communicated between the network part of the communication system and the mobile node by way of communication channels defined upon a radio air interface. In the exemplary implementation, two-way communication of data between the network part and the mobile node is effectuated by way of appropriate channels defined upon the radio air interface.

Arrows 44 are representative of communication channels defined upon the radio air interface that interconnect a radio access network with the mobile node to permit the communication of data therebetween.

The mobile node 12 forms a radio transceiver having a receive part 48 and a transmit part 52. The mobile node is typically operated by a user, and the user operates the mobile node, e.g., to initiate effectuation of a communication service.

Also as noted previously, the coverage areas of more than one radio access network overlap. Arrows 44-2 through 44-n are representative of communication channels extending between the mobile node and others of the radio access networks. When a mobile node is positioned at a location encompassed by more than one radio access network, the mobile node is within reception range of signals broadcast by the different ones of the radio access networks.

Different ones of the radio access networks might exhibit different communication capabilities. That is to say, some of the radio networks might support a communications service that is to be effectuated by the mobile node while others of the radio access networks do not.

Conventionally, a mobile node is unable to determine completely the available services of a radio network until the mobile node attempts to register with the service, and which typically involves first a registration procedure with the network itself. The registration procedures, however, are time-consuming, resulting in communication delays in the event that the mobile node registers with a radio network that is incapable of supporting the desired communication service, necessitating the mobile node to register subsequently with another network. Apparatus 62 of an embodiment of the present invention forms part of the radio communication system and facilitates identification of the communication service availability of a radio access network and, hence, the communication services supported by the radio network.

Apparatus 62 embodied at the network part includes a message generator 64 and a transmitter 66. The elements 64 and 66 are functionally represented and are implementable in any desired manner, e.g., including algorithms executable by processing circuitry. In the exemplary implementation, the message generator is embodied at the base station controller, and the transmitter is embodied at the base transceiver station. The message generator generates a system information message that is caused by the transmitter to be communicated upon a broadcast control channel (BCCH), a packet broadcast control channel (PBCCH), or an other appropriate channel.

The mobile node 12 includes additional apparatus 62 of an embodiment of the present invention. The apparatus embodied at the mobile node includes a detector 68 and a service availability identifier 72. The detector 68 is coupled to the receive part 48 and operates to detect delivery at the mobile node of a system information message, here represented at 74 transmitted by the network part on a control channel. Once detected, the indication if the available services of the radio network from which the message is communicated is ascertained by the service availability identifier. Responsive to the identifications made by the service availability identifier, a selector 76 selects whether to cause the mobile node to register with the network. If the network supports the communication service that is to be effectuated, the mobile node is permitted to register with the service on the associated network. Otherwise, the mobile node does not register with the network as the network is unable to support the communication service, and the mobile node searches for another network that better is able to support the communication service. Or, the mobile node registers with the network in spite of the network not being able to support the desired communication service.

In the exemplary implementation, the apparatus embodied at the mobile node further includes a channel listing 78 that identifies the channels that are to be monitored by the mobile node. The channel listing forms, e.g., or is associated with, a neighbor cell list pertaining to the cell in which the mobile node is positioned. The mobile node scans, such as when a communication service is to be effectuated, for the availability of networks in whose coverage areas that the mobile node is positioned. The mobile node scans the channels identified in the channel listing to detect signals broadcast thereon including, for instance, the system information messages generated pursuant to operation of an embodiment of the present invention.

Because the mobile node is able to determine the availability of services prior to registration with the network, the mobile node is able quickly to determine whether to effectuate a communication service therethrough. If the radio network is unable to support the communication service, the mobile node need not register with the network as the communication service is not effectuable therethrough.

Figure 2:
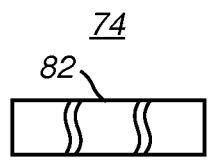
FIG. 2 illustrates an exemplary representation of a system information message generated pursuant to operation of an embodiment of the present invention.

FIG. 2 illustrates a representation of an exemplary system information message 74 generated pursuant to operation of an embodiment of the present invention at a network part of the radio communication system (shown in FIG. 1) and detected at a mobile node, such as the mobile node 12 shown in FIG. 1. The message 74 here forms a SYS INFO 13 GPRS INFO message that includes a field 82 that is populated with one or more values that identify the availability of services of the network at which the message is generated. The field is populated with a value, for instance, to identify that the network provides GPRS data communication services. Values populating the field, in one implementation, form a bitmap that is of values that indicate the communication services, or otherwise define the communication services supported by, the network at which the message is generated. The values, for instance, identify an access point name (APN) that identifies a data service or application routed by way of the SGSN/GGSN 26/28 (shown in FIG. 1), thereby to identify that the network is capable of performing end-to-end packet communication services. Information is exchangeable, for instance, between the correspondent entity and the SGSN/GGSN pursuant to identification information be included in the messages.

When the system information message is communicated upon a broadcast control channel and detected at the mobile node, the field 82 is accessed, the value or values contained therein extracted, and the values are analyzed to determine the communication service availability of the radio network from which the system information message originated. And, responsive to the analysis, a selection is made at the mobile node whether to register with the radio network.

Figure 3:
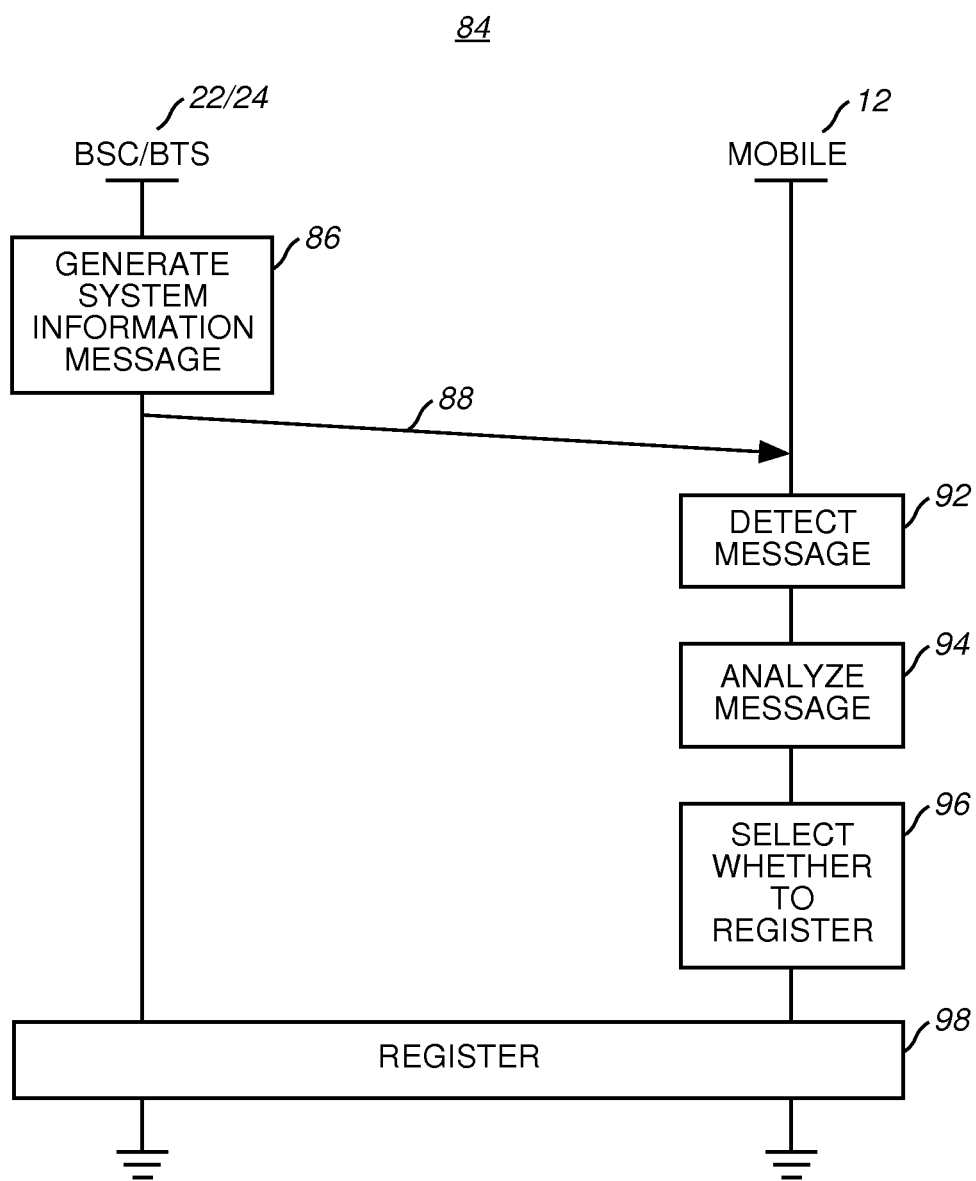
FIG. 3 illustrates a message sequence diagram representative of signaling generated and other operations performed pursuant to operation of an embodiment of the present invention.

FIG. 3 illustrates a message sequence diagram, shown generally at 84, that represents signaling generated during operation of, and other operation of, the radio communication system 10 shown in FIG. 1. Signaling between an exemplary base station system formed of a base transceiver station-base station controller pair and a mobile node 12 is shown.

First, and as indicated by the block 86, the system information message is generated at the network. Then, and as represented by the segment 88, the system information message is communicated upon a broadcast control channel and delivered to the mobile node.

Once delivered to the mobile node, the mobile node detects, indicated by the block 92, the system information message and extracts the value, or values, contained in the system information message that identify the available services of the radio network at which the message originates.

Then, and as indicated by the block 94, the values extracted from the system information message are analyzed to determine the available services of the radio network and to determine whether the radio network supports the communication service that is to be effectuated. And, as indicated by the block 96, selection is made at which the system information message is originated.

In the representation of the figure, selection is made to register with the network and subsequently with the supported communication service, and registration is indicated by the block 98. Alternately, in the event that selection is made not to register with the radio network, the mobile node scans other channels to detect system information messages broadcast by other radio networks, and the same procedure is carried out. In an alternate implementation, scanning is performed prior to analysis of the system information messages detected on different ones of the channels. And, detection, analysis, and selection is performed upon completion of the scanning.

Figure 4:
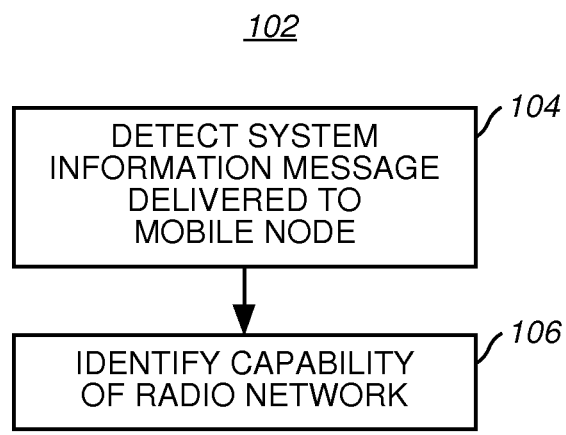
FIG. 4 illustrates a method flow diagram illustrating the method of operation of an embodiment of the present invention.

FIG. 4 illustrates a method flow diagram, shown generally at 102, representative of the method of operation of an embodiment of the present invention. The method facilitates identification to a mobile node of available services of a radio network in whose coverage area that the mobile node is positionable.

First, and as indicated by the block 104, detection is made at the mobile node of communication on a broadcast control channel of a system information message that includes values representative of the available services of the radio network. Then, and as indicated by the block 106, the network capability of the radio network is identified responsive to the detected indications of the values included in the system information message.

Because the mobile node determines the services available by way of a radio network prior to registration with the radio network, effectuation of a selected communication service is carried out more efficiently. Determination of the services supported by the of a radio network is not determined by a trial and error procedure by registering with radio networks until a radio network is located that supports the communication service that is to be effectuated.

The previous descriptions are of preferred examples for implementing the invention, and the scope of the invention should not necessarily be limited by this description. The scope of the present invention is defined by the following claims.

What is claimed is:

1. A mobile node capable of communications with a selected network of a plurality of networks, the mobile node comprising:
a channel listing that maintains identification of channels that are to be monitored for broadcast of network system information messages, the network system information messages each including network system information, which identifies a supported communication service supported by a network from which the system information message is broadcast;
a detector that detects, prior to mobile-node registration, a system information message on an identified monitored channel from one of the plurality of networks and that detects, prior to mobile-node registration, values representative of the availability of the supported communication service from the network broadcasting on its associated channel;
a service availability identifier that ascertains, prior to mobile-node registration, from said values detected by said detector whether said one of the plurality of networks supports a desired communication service and that permits, prior to mobile-node registration a subsequent selection of said one network and subsequent registration with said one network by the mobile node for communication of messages via said desired communication service when said one network is ascertained to support said desired communication service; and
a selector that selects whether to cause the mobile node to register with said one network in response to said service availability identifier permitting registration with said one network.

2. The mobile node of claim 1 further comprising a transmitter part that transmits a registration from said mobile node responsive to said permitting by said selector.

3. The mobile node of claim 1 further comprising a receiver part that receives signals on channels identified from said channel listing and provides said signals to said detector.

4. The mobile node of claim 3 wherein said service availability identifier further denies selection of said one network by the mobile node, denies registration with said one network by the mobile node, and causes said receiver part to search for another identified channel from said channel listing.

5. The mobile node of claim 1 wherein said detector detects network system information messages on a plurality of monitored channels and said service availability identifier further ascertains from communication service availability values which of the plurality of networks supports said desired communication service, subsequently permitting selection and registration with a network of the plurality of networks ascertained to support said desired communication service.

6. The mobile node of claim 1 wherein said channels that are monitored for the system information further comprise packet broadcast control channels and wherein said system information message detected by said detector further comprises a packet system information message.

7. A method of operation of a mobile node capable of communications with a selected network of a plurality of networks, said method comprising:
maintaining in a channel listing identification of network-associated channels to be monitored for broadcast of network system information messages, the network system information messages each including network system information, which identifies a supported communication service, supported by a network from which the network system information message is broadcast;
monitoring a plurality of identified channels of said channel listing for the system information messages broadcast by networks, which identify availability of a supported communication service on associated channels;
detecting, prior to mobile-node registration, a system information message on a monitored channel from a one network of the plurality of networks;
detecting, prior to mobile-node registration, values representative of the availability of the supported communication service from said detected system information message of said one network broadcasting on its associated channel;
ascertaining from said detected values whether said one network supports a desired communication service;
permitting a subsequent selection of said one network and subsequent registration with said one network by the mobile node for communication of messages via said desired communication service when said one network is ascertained to support said desired communication service; and
selecting whether to cause the mobile node to register with said one network in response to said permitting.

8. The method of claim 7 further comprising transmitting a registration from said mobile node responsive to said permitting registration.

9. The method of claim 7 further comprising receiving signals on said plurality of channels identified from said channel listing and providing said signals for detection of said system information message.

10. The method of claim 7 further comprising denying selection of said one network by the mobile node, denying registration with said one network by the mobile node, and causing a search for another monitored channel from said channel listing.

11. The method of claim 7 further comprising detecting network system information messages on a plurality of monitored channels, ascertaining from communication service availability values which of the plurality of networks supports said desired communication service, and subsequently permitting selection and registration with a network of the plurality of networks ascertained to support said desired communication service.

12. The method of claim 7 further comprising wherein said monitoring of a plurality of channels of said channel listing further comprises monitoring packet broadcast control channels and wherein said detecting said system information message further comprises detecting a packet system information message.

* * * * *